United States Patent
Rinderknecht et al.

(10) Patent No.: US 10,935,464 B2
(45) Date of Patent: Mar. 2, 2021

(54) METHOD FOR DETERMINING SUPPORT POINTS OF A TEST PLAN

(71) Applicant: Technische Universität Darmstadt, Darmstadt (DE)

(72) Inventors: Stephan Rinderknecht, Gomaringen (DE); Stéphane Foulard, Rodgau (DE); Rafael Fietzek, Darmstadt (DE); Arved Esser, Darmstadt (DE)

(73) Assignee: Technische Universität Darmstadt, Darmstadt (DE)

( * ) Notice: Subject to any disclaimer, the term of this patent is extended or adjusted under 35 U.S.C. 154(b) by 0 days.

(21) Appl. No.: 16/343,817

(22) PCT Filed: Oct. 18, 2017

(86) PCT No.: PCT/EP2017/076562
§ 371 (c)(1),
(2) Date: Apr. 22, 2019

(87) PCT Pub. No.: WO2018/073286
PCT Pub. Date: Apr. 26, 2018

(65) Prior Publication Data
US 2019/0265128 A1    Aug. 29, 2019

(30) Foreign Application Priority Data
Oct. 20, 2016 (DE) ..................... 10 2016 120 052.2

(51) Int. Cl.
*G01M 17/007*    (2006.01)
*G01D 21/02*    (2006.01)
(Continued)

(52) U.S. Cl.
CPC .......... *G01M 17/007* (2013.01); *G01D 21/02* (2013.01); *G01M 15/02* (2013.01); *G05B 15/02* (2013.01); *G07C 5/0841* (2013.01)

(58) Field of Classification Search
CPC .. G01M 17/007; G01M 15/02; G07C 5/0841; G01D 21/02
See application file for complete search history.

(56) References Cited

U.S. PATENT DOCUMENTS

2002/0188507 A1* 12/2002 Busche ............ G06Q 30/0269
                                                        705/14.42
2009/0271138 A1    10/2009 Korde et al.
(Continued)

FOREIGN PATENT DOCUMENTS

| AT | 511577 | 6/2011 |
| DE | 10340363 A1 | 5/2005 |

(Continued)

OTHER PUBLICATIONS

C. Beidl and H.-M. Koegeler—Beherrschung komplexer Entwicklungsprozesse, Grundlagen Verbrennungsmotoren, ATZ/MTZ—Fachbuch, Springer Fachmedien, Wiesbaden, 2014.
(Continued)

*Primary Examiner* — Michael J Dalbo
(74) *Attorney, Agent, or Firm* — Smartpat PLC

(57) ABSTRACT

The invention relates to a method (1) for determining supporting points of a test plan (9) for measuring pre-defined test variables of a test machine on the basis of previously measured operating values (3) of operating variables of at least one field machine during the normal use thereof. In an aggregation step (2), the detected operating values (3) are allocated to categories (4) with regard to at least one selected operating variable, according to a predefined classification rule. Default variables are selected in a default step (5) before or after the aggregation step (2). The default variables form at least one subset of the operating variables. The operating category frequency (7) for each category (4) is determined in a determination step (6) following the aggregation step (2). In a subsequent determination step (8), the
(Continued)

supporting points of the test plan (9) are determined on the basis of the operating category frequency (7). The supporting points are determined in the determination step (8) such that a deviation of a relative test category frequency, on the basis of the test plan (9), of determined default values of the default variables, associated with categories (4) according to the classification rules, from a relative operating category frequency of the operating values (3) classed according to the classification rules, of the operating variables corresponding to the default variables, is minimised according to a predefined optimisation criterion.

13 Claims, 6 Drawing Sheets

(51) Int. Cl.
    *G01M 15/02*     (2006.01)
    *G07C 5/08*     (2006.01)
    *G05B 15/02*     (2006.01)

(56) References Cited

U.S. PATENT DOCUMENTS

| | | |
|---|---|---|
| 2014/0067197 A1 | 3/2014 | Stadlbauer et al. |
| 2016/0035150 A1* | 2/2016 | Barfield, Jr. ....... G05B 23/0254 701/29.3 |
| 2017/0132117 A1* | 5/2017 | Stefan ................. G06F 11/3604 |
| 2018/0335370 A1* | 11/2018 | Maschmeyer ........ G01M 15/02 |

FOREIGN PATENT DOCUMENTS

| | | |
|---|---|---|
| DE | 102004010808 A1 | 9/2005 |
| DE | 102009018785 A1 | 3/2010 |

OTHER PUBLICATIONS

Ralf Oberfell, Karlsruher Schriftenreihe Fahrzeugsystemtechnik 38, Stochastische Simulation von Energieflüssen im Nutzfahrzeug, Ein einsatzorientiertes Bewertungs- und Optimierungsverfahren, Karlsruhe, 2015.

* cited by examiner

FIG 3
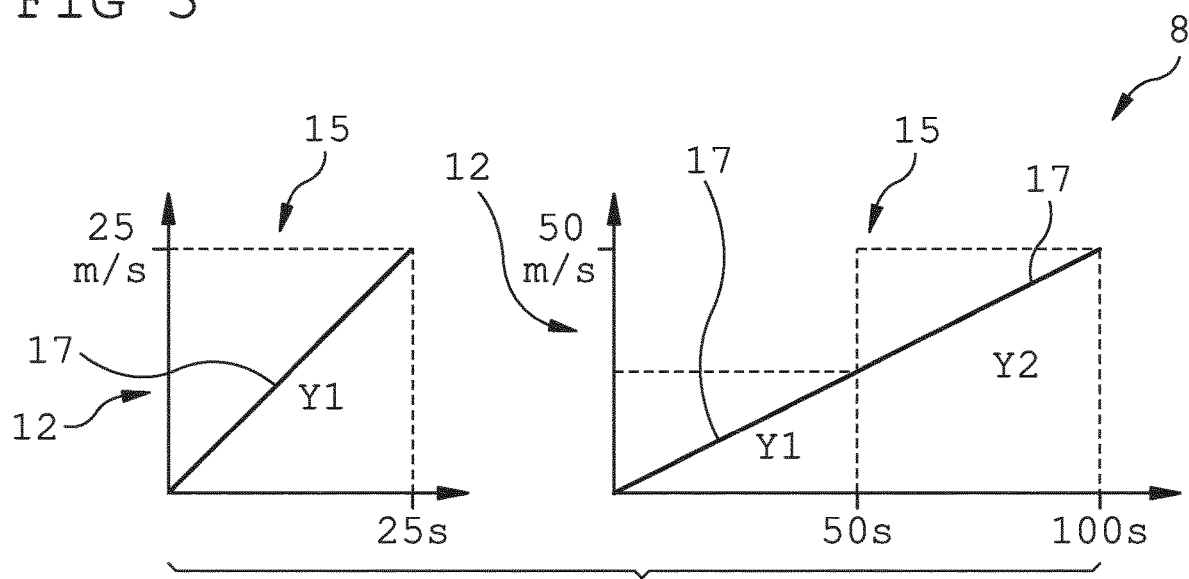
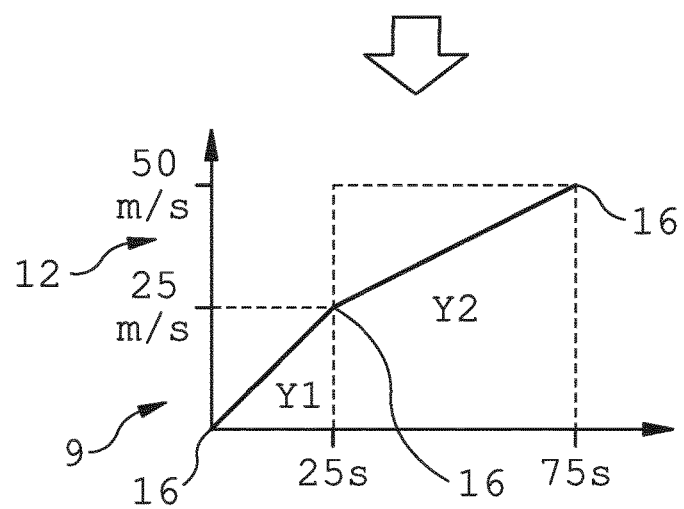

FIG 4
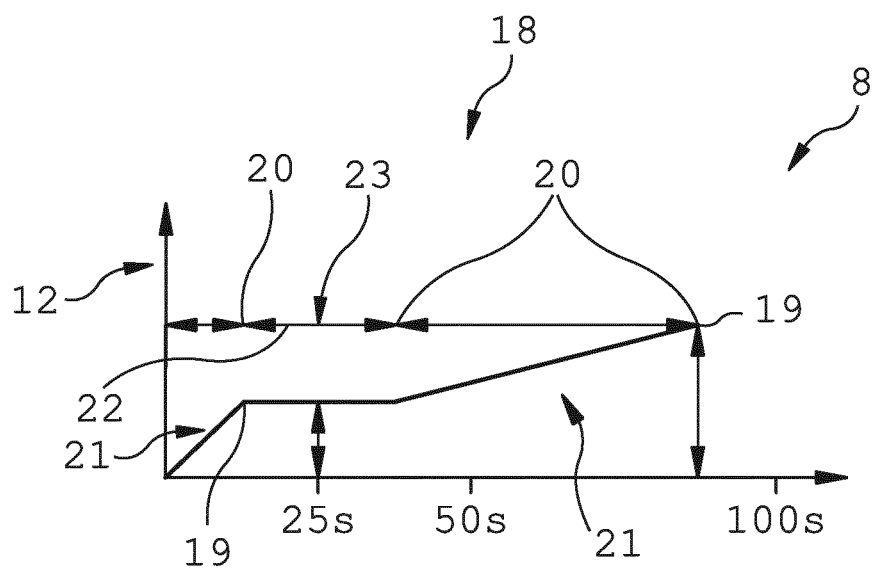
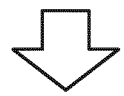
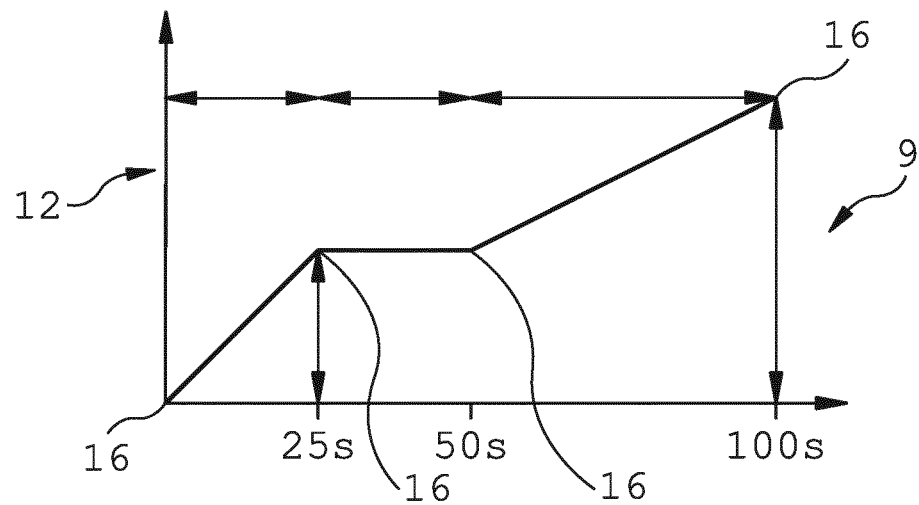

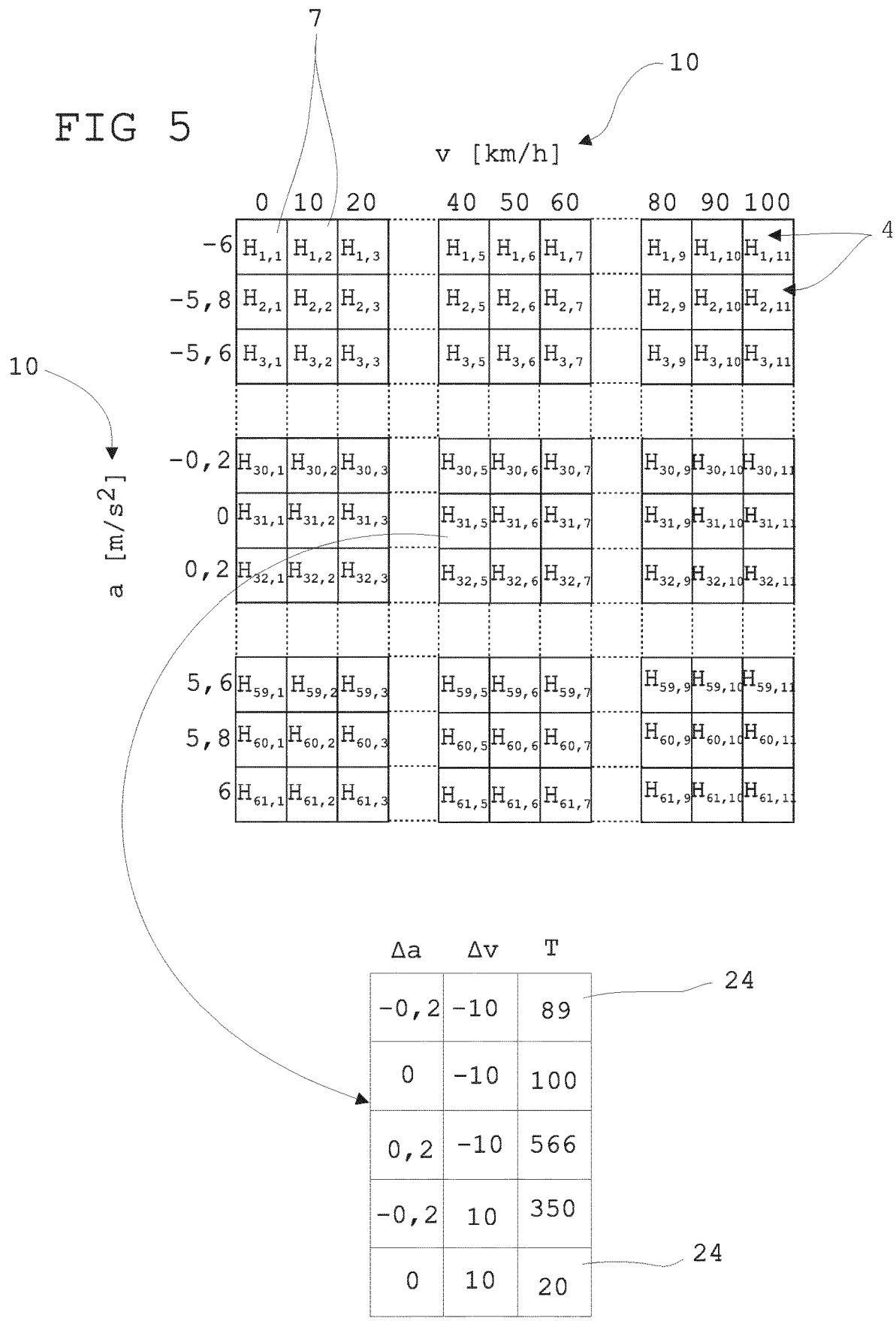

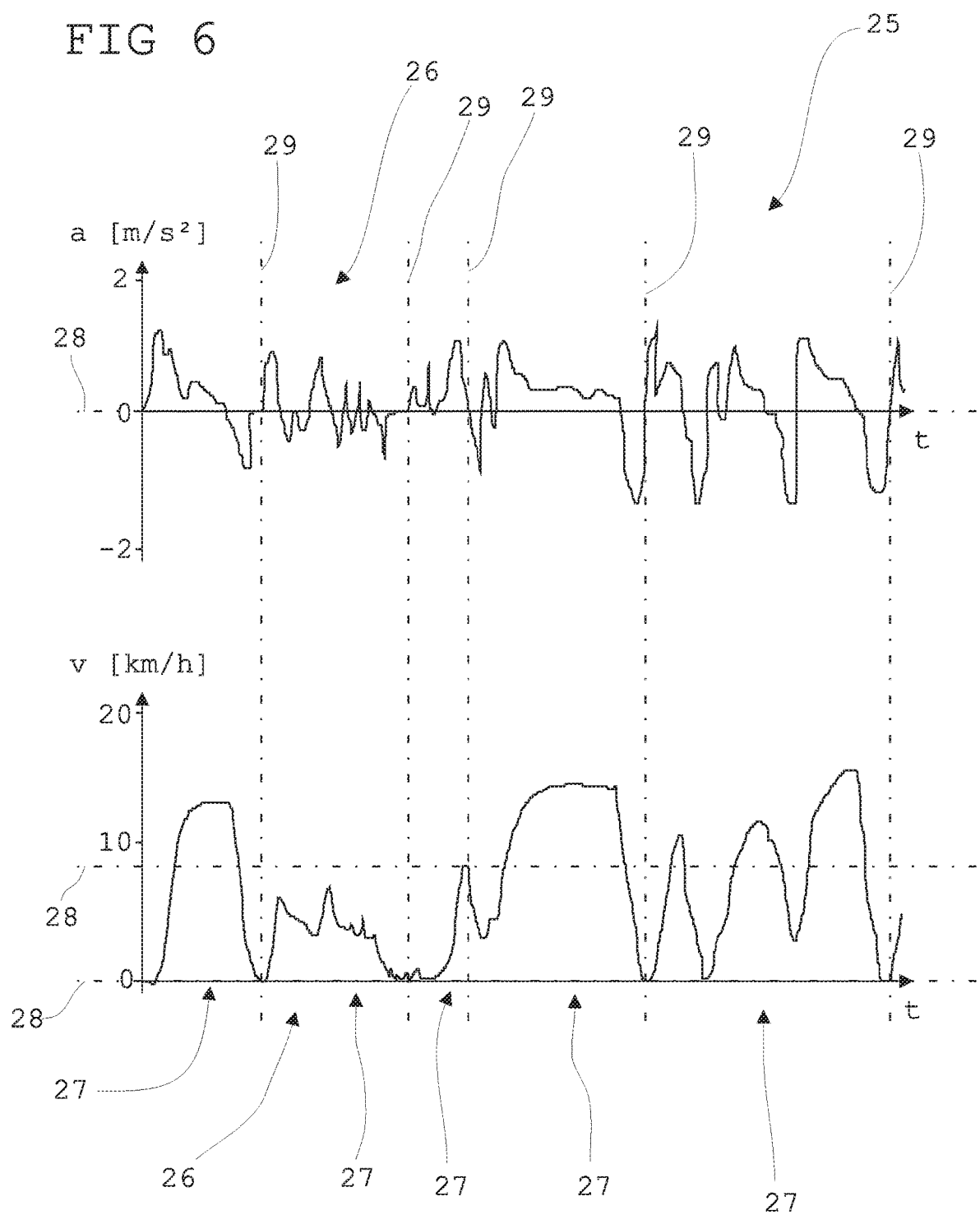

METHOD FOR DETERMINING SUPPORT POINTS OF A TEST PLAN

TECHNICAL FIELD

The disclosure relates to a method for determining test points of a test cycle for measuring or simulating pre-defined test variables of a test machine.

BACKGROUND

Test cycles are used in the measuring of certain characteristics of test machines, for example internal combustion engines, transmissions, or entire vehicles. Test cycles are also used in the measuring of certain characteristics of electric motors, generators and comparable machines. With the aid of the test cycles, test values of the pre-defined test variables are meant to be measured and detected in a large variation range of machine parameters, which influence the test variables, in as short a time as possible. In addition, test cycles permit the repetition of a test, in order to, for example, review and validate the already-determined test results. Test cycles can also be used to establish characteristics of the test machines, through a simulation, on the basis of a mathematical model of the test machine.

Any parameters of the test machine come into consideration as test variables. These parameters can either be directly detected by measurement or can be established on the basis of metrologically detected variables via mathematical models. If, for example, a motor vehicle is to be measured, the test variable can be the fuel consumption of the motor vehicle or, for example, the damage level of different components of the motor vehicle.

The test cycles used for measuring comprise a sequence of test points for each machine parameter of the test machine to be varied in the test. The test machine is controlled or regulated with the aid of these test points such that the different operating parameters, at time points linked with the test points, assume machine parameter values likewise linked with the test points. Each test point thus contains a time point information, as well as a machine parameter value. The test points can, for example, relate to speeds of a motor vehicle which this vehicle is to reach at certain time points. The sequence of the test points here forms a speed profile to be driven by the motor vehicle, or a route, provided that the transverse dynamics of the motor vehicle is taken into account.

Different standardized test cycles are known, in particular for determining the fuel consumption of motor vehicles. A frequently used test cycle is the so-called NEDC Cycle.

Numerous methods to establish test cycles are known from the prior art. The methods used are hereby usually selected according to the purpose intended with the measurement. For example, in the measuring of dynamic characteristics of the test machine, test cycles are usually used, which fundamentally differ from such test cycles with which the test variables are to be measured under stationary operating conditions. Known methods for creating test cycles are, for example, summarized under the headings "design of experiments" and "statistical test planning".

In addition, it is desirable in several areas to design test cycles such that, through the test cycles, a real usage profile of a fielded machine is obtained. This is desirable, for example in establishing the fuel consumption of a motor vehicle, as the known standardized driving cycles or test cycles for the determining of the fuel consumption, such as the NEDC are based on rather unrealistic speed profiles. In addition, no multidimensionality, such as for example the simultaneous consideration of the speed and the motor temperature, is taken into consideration. To that end, no methods are known from the prior art, which permit a simple, quickly adaptable creation of an, in particular multidimensional test cycle, which achieves an actual use of the fielded machine in the test machine.

SUMMARY

It is therefore seen as the object of the invention to provide a method for determining support points (also referred to as "test points") of a test plan, wherein the test plan, if possible, describes a real usage profile, but can be measured in a substantially shorter time period than in the actual usage.

This object is achieved by a method for determining support points of a test plan for measuring or simulating pre-defined test variables of a test machine on the basis of previously metrologically established operating values of operating variables (also referred to as "types of operating values") of at least one fielded machine during its intended use, wherein, in an aggregation step, the detected operating values are assigned, according to a pre-defined classification rule with respect to one or multiple selected operating variables, to classes (also referred to as "bins"), wherein, in a specification step, prior to or after the aggregation step, specification variables are selected, wherein the specification variables form at least one subset of the operating variables, wherein, in an identification step following the aggregation step, the frequency of operating classes for each class is determined, and wherein, in a subsequent determination step, the support points of the test plan are determined on the basis of the operating class frequency, wherein the support points are determined in the identification step such that a deviation of a relative test class frequency, established on the basis of the test plan, and specification values of the specification variables assigned to classes according to the classification rule, is minimized, by a relative operating class frequency of the operating values classified according to the classification rule of the operating variables, corresponding to the specification variables, according to a pre-defined optimization criterion. In this way, it is possible, for example, to establish the fuel consumption of a motor vehicle on the basis of realistic test plans. Additionally, for example also regional differences in the usage of motor vehicles and different usage profiles of buyer groups of established motor vehicles can, in this way, be taken into account, in turn, with respect to the establishing of fuel consumption. The use of test plans which map the actual usage of the fielded machine, can, for example, however also be used for the design of components of new machines, since, in this way, an entire life cycle of the new components installed in the test machine can be established on the basis of real usage profiles.

The test machine can for example be a newly developed motor vehicle. The at least one fielded machine relates, for example, to a series-produced motor vehicle used in normal traffic and comparable with the test machine. The test variable can for example be a fuel consumption related to a 100 km drive. The types of operating values are at least the types of operating values of the motor vehicle significantly determining the fuel consumption, for example the vehicle speed, the vehicle acceleration, the respectively selected gears, etc. The operating values of these types of operating values are advantageously continuously detected during the use of the motor vehicle, and/or are established on the basis of measurement variables metrologically detected and processed with the help of mathematical models.

The operating values, directly metrologically determined or established with the aid of mathematical models on the basis of measurement values are binned with respect to one or multiple selected types of operating values. For example, the operating values of the types of operating values used for measuring the fuel consumption of a motor vehicle, e.g. actually driven speeds, are assigned to individual bins, such as for example, 0-30 km/h, 31-50 km/h, 51-100 km/h, and >100 km/h, and in the establishing step, the relative size for each of the bins with which the respective speed range was previously detected is determined.

On the basis of these relative bin sizes, the test cycle is subsequently or the test points of the test cycle are subsequently determined such that the relative size of test bins of specification values identified on the basis of the test cycle and assigned to bins according to the binning rule, of the specification variables correspond, as much as possible, to the respective relative sizes of the operating value bins. In this way, a test cycle can be established, with which speeds are driven, which fall into the bin 30-51 km/h and into the bin 0-30 km/h proportionally as often as the actually established operating values. The relative size of test bins is advantageously determined with the aid of a mathematical model of the test machine. It is, however, also possible and provided to establish the relative size of test bins through the execution of tests with the test machine.

Insofar as the test cycle is established on the basis of the operating values of merely one fielded machine, the fuel consumption of the test machine can, for example, advantageously be established on an individualized customer basis, and the driving behavior of one of each customer can be taken into consideration. Insofar as the goal of the measurement, however, is the establishing of the test variables for a common usage of the fielded machine, independent of individual fielded machines, it is advantageously provided that the operating values are detected in a plurality of fielded machines.

The test cycle determined with the aid of the disclosed method can advantageously also be used to optimize operating strategies of a test machine with the aid of representative user profiles and to optimally parameterize the components of a test machine.

In particular insofar as the specification variables are already known before the determination of the types of operating values, it is advantageously provided that the specification variables correspond to the selected types of operating values. In this way, the effort necessary for the determination of the operating values can be reduced, as merely operating values must be established for types of operating values corresponding to the specification variables.

It is alternatively provided that all relevant operating values are continuously determined in the fielded machines and are transmitted once or in regular intervals to a central database. In this way, the specification variables can, at a later point in time, be flexibly selected from the detected types of operating values, and thus can be adapted to the selection and thus to the respective requirements.

It is also possible and provided that, in place of the transmission of the operating values, exclusively the relative sizes of already binned operating values are transmitted to the central database. In this way, the data quantity to be transmitted can be significantly reduced. The aggregation step here already occurs, for example, on a control device of the various fielded machines. In this way, the privacy of the person using the fielded machine is also protected, since exclusively aggregated data are stored and further used. It is also possible and provided that the entire method is carried out on a control device of a fielded machine.

Advantageously, it is provided that the operating values are overwritten and/or deleted directly after the aggregation step. The privacy of the persons using the fielded machine can be particularly well protected in that the operating values are not stored.

In order to adapt the test cycle determined with the disclosed method as well as possible to the actual use profile, it is provided for that, in the aggregation step, transition values are determined for one or multiple binned types of operating values, wherein a transition value is the number of the changes of a type of operating value or multiple types of operating values of a bin into a different bin, and wherein, in the determination step, the test points of the test cycle are determined on the basis of the relative sizes of the operating value bins and the transition values, wherein the test points are established in the identification step such that a deviation of relative sizes of test bins of the specification values identified on the basis of the test cycle and assigned to bins according to the binning rules, from relative sizes of the corresponding operating value bins of the operating values binned according to the binning rule, of the types of operating values corresponding to the specification variables, as well as a deviation of test transition values for the specification variables from the transition values for the types of operating values corresponding to the specification variables, is minimized according to the pre-defined optimization criterion, wherein a test transition value is the number of changes of a specification variable or multiple specification variables from one bin into another bin. In this way, the influence of the frequency of the operating point changes on the test variables can be taken into account in the determination of the test cycle.

Through the use of the transition values, how often and between which bins the driven speed changes, can, in the test cycle exemplarily described above, also be taken into account in addition to the relative bin sizes of driven speeds. In this way, how long the types of operating values are usually held in the respective bins, before an operating value, new and assigned to another bin is driven, is additionally also considered. In addition, it is also possible by considering multiple types of operating values, to take into account transition values for the changing of multiple types of operating values of a bin or a bin combination into a different one. A bin combination is the bins of the types of operating values taken into account, which are assigned the operating values in the respective state.

It is also possible and provided that, in the aggregation step, transition possibilities for one or multiple binned types of operating values are determined, wherein a transition possibility is a transition, the transition value of which is greater than zero, wherein a transition value is the number of changes of an type of operating value or multiple types of operating values from one bin into another bin, wherein, in the determination step, the test points of the test cycle are identified on the basis of the relative sizes of the operating value bins and the transition possibilities, wherein the test points are established in the determining step such that a deviation of relative sizes of test bins of specification values identified on the basis of the test cycle and assigned to bins according to the binning rule, of the types of operating values, from relative sizes of the corresponding operating value bins of the operating values binned according to the binning rule, of the types of operating values corresponding to the specification variables, is minimized according to the pre-defined optimization criterion, and in that the test cycle exclusively comprises such test transitions that are covered by the transition possibilities, wherein the test transitions are all changes of a specification variable or multiple specification variables from one bin into another bin. In this way, a test cycle can be created on the basis of the relative sizes of the operating value bins, which cycle comprises transitions that are exclusively present in the detected types of operating values and therefore are physically possible.

To establish the test points of the test cycle, it is advantageously provided that the test points of the test cycle are determined, in the determination step, with the aid of a Markov chain process, on the basis of the relative sizes of the operating value bins and the transition values. Bins can be selected, with the aid of Markov chain processes, on the basis of the determined relative sizes, in which bins the specification variables of the next test point of the test cycle lie, wherein the test cycle, resulting with the aid of the Markov chain process, comprises relative sizes of test bins and test transition values, which, in a sufficiently-long test cycle or in a test cycle with a sufficient number of test points, can, very strongly, approximate the relative sizes of the operating value bins or in particular the transition values, or can correspond to these.

In order to be able to simply determine test cycles, for example for different test requirements, it is provided that test points of an initial test cycle are determined, in the determination step, with the aid of a Markov chain process, on the basis of the relative sizes of the operating value bins and the transition values. The initial test cycle is determined in the same manner and fashion, with the aid of the Markov chain process, as the previously described test cycle. However, the initial test cycle comprises especially many test points, and serves as the basis for the following production of one or multiple test cycles. Advantageously, the initial test cycle comprises 3 to 4 times as many test points as the test cycle to be determined on the basis of initial test cycles, and particularly advantageously, 10 times as many support places.

To establish different test cycles from the initial test cycle, it is provided that, in the identification step subsequent to the determination of the initial test cycle, the initial test cycle is subdivided into initial test cycle segments with the aid of a segmentation process. The initial test cycle segments can then, with the aid of a suitable method, advantageously a random process, be combined to one or multiple new test cycles.

Advantageously, it is provided for that for the segmentation, for at least one initial specification variable of the initial test cycle, respectively at least one status value, is specified, and that the initial test cycle segments are generated such that each first and last initial specification value of each initial specification variable has the respective status value, for which at least one status value was pre-defined. In this way, it can, inter alia, be achieved that the test cycles constituted from the initial test cycle segments have a continuous signal curve and no undesired transitions and in particular no transitions which are not included in the transition possibilities, between successive test points, on the places, at which different initial test cycle segments were combined or composed with one another.

Advantageously, it is provided for that, respectively at least one status value is pre-defined for the segmentation, for at least two initial specification variables of the initial test cycle, and that the initial test cycle segments are generated such that each first and last initial specification value comprises the respective status value of each initial specification variable, for which at least one status value was pre-defined. In this way and manner, multidimensional test cycles can be composed with the disclosed method in a simple manner. Through such a segmentation, multidimensional initial test cycle segments can be generated, wherein a continuous transition between the initial test cycle segments, in the test cycles generated on the basis of these initial test cycle segments, is made possible. For example, the driven speed and the acceleration of the fielded machines are used, as types of operating values, for the determination of a test cycle for the measurement of a motor vehicle, and the respective operating values are assigned to bins in the aggregation step, as well as the transition values are determined. Subsequently, an initial test cycle is created with the aid of the Markov chain process. This initial test cycle is then segmented with the aid of the segmentation process, wherein the initial test cycle segments are generated such that each first and last initial test value of each initial specification variable, for which at least one status value was pre-defined, comprises the respective status value. For example, for the segmentation, status values are pre-defined for the acceleration as well as also for the speed. A segmentation can here result, for example, if, in the initial test cycle, the speed, as well as the acceleration comprises one of the specified combinations of the status values for the speed and the acceleration. For example, the initial test cycle is segmented at the places at which the speed and the acceleration is zero and is segmented at the places at which the speed amounts to 10 km/h and the acceleration is zero.

The combinations of the status values for the segmentation are advantageously pre-defined taking into account the relative sizes of the operating value bins, wherein the combinations of the status values are advantageously selected from the bins, which comprise comparatively large relative sizes of the operating value bins. In this way, numerous initial test cycle segments can be composed.

Advantageously, it is provided for that multidimensional test cycles are created with the aid of the disclosed method. The segmentation with the segmentation process therefore occurs likewise in multiple dimensions or regarding multiple specification variables.

In order to determine one or multiple test cycles on the basis of the determined initial test cycle segments, it is provided for that, subsequently, the initial test cycle segments are to be composed together, using a random process, to the test cycle such that the pre-defined optimization criterion is minimized.

In a particularly advantageous configuration of the disclosed method, it is provided that numerous candidate test cycles are subsequently composed from the initial test cycle segments with at least one random process and that subsequently, the candidate test cycles are evaluated with respect to the optimization criterion and the candidate test cycle which minimizes the optimization criterion is selected as test cycle. In this way, suitable candidate test cycles can be created on the basis of the present initial test cycle segments with respect to different test cycle requirements and the best, that is the test cycle(s) possibly minimizing the optimization criterion, is/are selected out of these candidate test cycles.

To determine the test points of the test cycle, it is advantageously provided that, in an old test cycle evaluation step, old test operating values of old test types of operating values are determined on the basis of already present old test cycles, wherein the old test operating values form the operating values and, according to the binning rule, are assigned to bins, and wherein the test points are determined from portions of the old test cycles in the determination step, wherein the portions are selected such that a deviation of relative sizes of test bins of the test values determined on the basis of the test cycle and assigned to bins according to the binning rule, from relative sizes of the corresponding operating value bins of the old test operating values binned according to the binning rule, is minimized according to the specified optimization criterion. In this way, the new test cycle can be composed from portions of one or multiple old test cycles.

Advantageously, it is provided for that the determination of the portions of the old test cycles occur with an as described-above segmentation process.

Advantageously, it is provided for that the old test operating values are determined at an old test machine comparable to the test machine. In this way, it can be achieved that the machine parameter values assigned to the test points can actually be achieved and driven by the test machine.

Advantageously, it is provided that the old test operating values are determined metrologically. Advantageously, recordings of old test types of operating values detected in actual measurements are used for this purpose.

It is, however, also possible and provided for that the old test operating values are determined through a mathematical model of the test machine or the old test machine. In this way, the effort to determine the old test operating values can be significantly reduced and, also, old test cycles can be used to establish the test points of the test cycle, for which no actually-determined types of operating values are given.

Advantageously, it is provided for that the test values are determined through a mathematical model of the test machine. Advantageously, operating parameters of the test machine, metrologically-detected, in the measurement, with the test cycle, are processed in the mathematical model.

Further advantageous configurations of the method are explained in greater detail by means of exemplary embodiments illustrated in the drawings.

BRIEF DESCRIPTION OF THE DRAWINGS

FIG. 3 is a schematically represented flow diagram of the identification step using old test cycles.
FIG. 4 is a schematically represented flow diagram of the identification step using a parameterizable standard test cycle.
FIG. 5 is a schematic representation of a conjunction between relative sizes of the operating value bins and transition values.
FIG. 6 is a schematic representation of the flow of a segmentation process.

DETAILED DESCRIPTION

Figure 1:
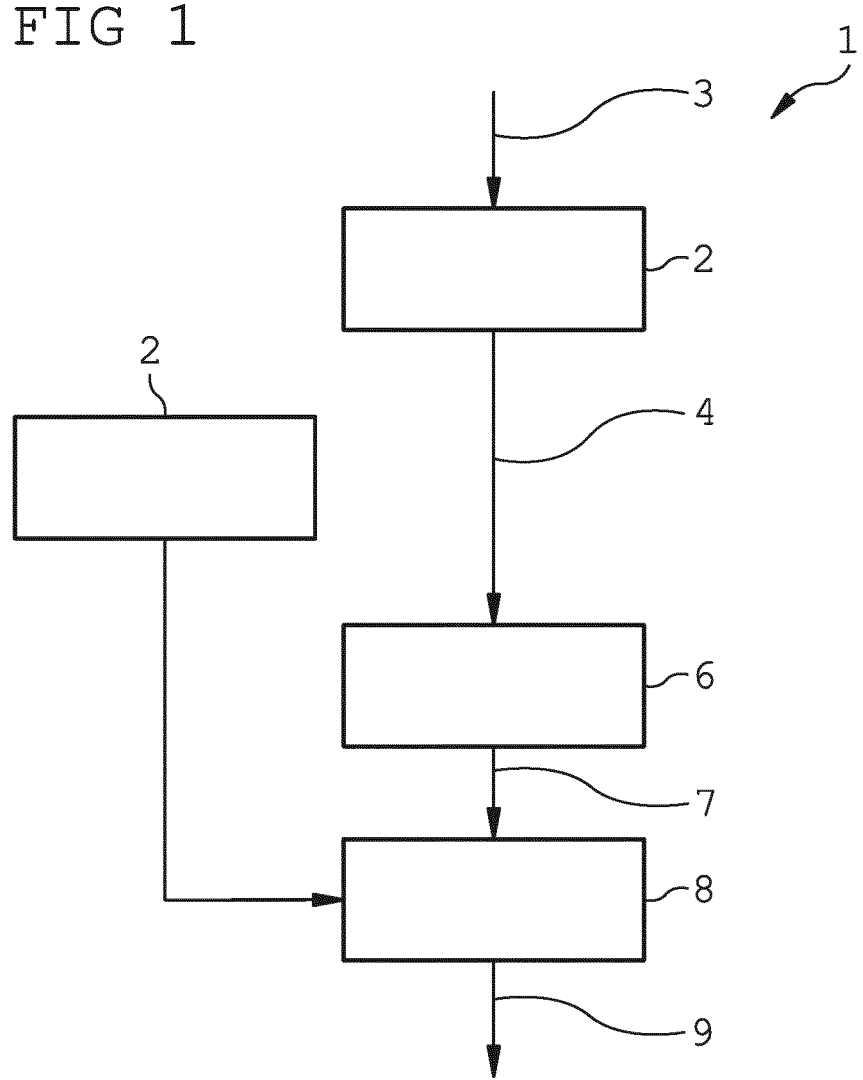
FIG. 1 is a schematically represented flow diagram of the method for determining test points of a test cycle.

FIG. 1 schematically shows a flow diagram of a method 1 for determining test points of a test cycle. In an aggregation step 2, metrologically-established operating values 3 of at least one fielded machine are assigned to bins 4 according to a pre-defined binning rule. In a specification step 5 subsequent to the aggregation step 2, specification variables are selected. The specification variables are types of operating values of the test machine which have a relevant influence on the test variables and therefore should be varied, corresponding to the test cycle to be established, in the measurement of the test machine.

Subsequently, the relative sizes of the operating value bins are determined in a determination step 6 for each bin 4, into which the operating values 3 were previously categorized. On the basis of the thus-determined relative sizes of the operating value bins 7, a test cycle 9 is established in an identification step 8, with the aid of a suitable optimization process.

Figure 2:
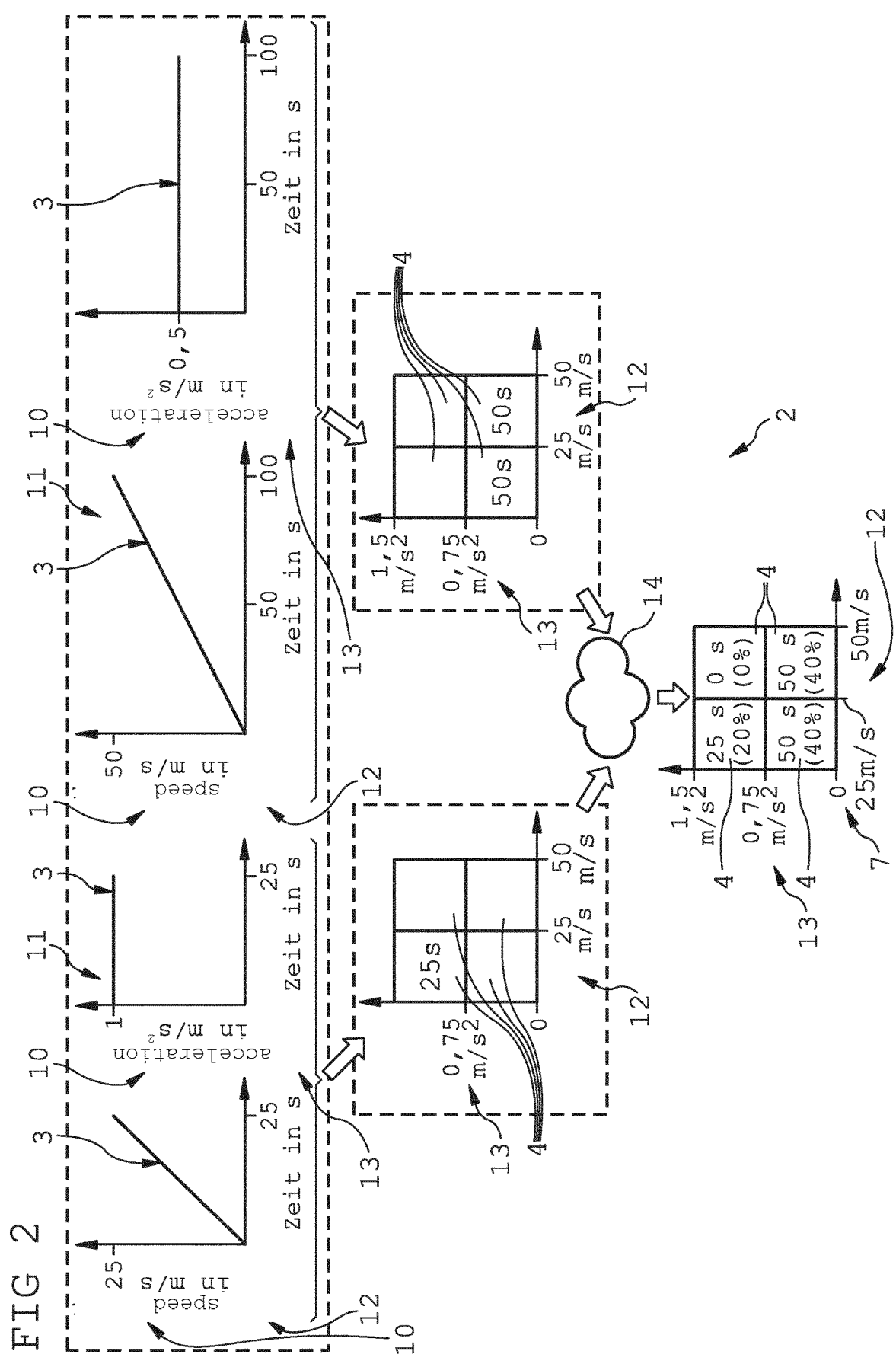
FIG. 2 is a schematically represented flow diagram of the aggregation step.

FIG. 2 schematically shows a possible sequence of the aggregation step 2. Initially, operating values 3 are metrologically detected from types of operating values 10 of multiple fielded machines 11. The types of operating values 10 relate to the speed 12 and the acceleration 13 of different motor vehicles.

Subsequently, the detected operating values 3 are assigned, according to a pre-defined binning rule, to bins 4, with respect to speed 12 and acceleration 13. The assignment, occurring in each case separately for the fielded machines 11 is subsequently brought together, and the thus-determined relative sizes of the operating value bins 7 are stored in a database 14. How long the fielded machines 11 have respectively driven the binned speed and acceleration combinations can be taken from the relative sizes of the operating value bins 7.

FIG. 3 schematically illustrates the sequence of an identification step 8. The test points 16 of a test cycle 9 are determined from portions 17 of old test cycles 15, in the identification step 8, on the basis of already-present old test cycles 15.

FIG. 4 shows a schematically represented flow diagram of the identification step 8 using a parameterizable standard test cycle 18. The standard test cycle 18 comprises a pre-defined sequence of the speed 12. Speed values 19, as well as time points 20, at which the speed values 19 are supposed to have been reached, can be specified in variation portions 21 of the standard test cycle 18. A time duration 22 of a specified portion 23 can, in this example, not be specified. It is also possible, however, and provided for that all parameters are freely selectable. Through a suitable optimization process, the speed values 19 and the time points 20 of the standard test cycle 18 are adapted such that a deviation of relative sizes of test bins of specification values of the specification variables identified on the basis of the test cycle and assigned to bins according to the binning rule, from relative sizes of the corresponding operating value bins of the operating values, binned according to the binning rule, of the types of operating values corresponding to the specification values is minimized according to a specified optimization criterion.

It is alternatively also possible to identify the test points, as well as the number of the test points, using a suitable optimization process, starting from zero.

FIG. 5 shows a schematic illustration of the relation between the relative sizes of the operating value bins 7 (H) and the transition values 24 (T). In the illustration, individual relative sizes of the operating value bins 7 and transition values 24 are denoted by a reference character.

In an aggregation step, operating values of types of operating values 10 of multiple field machines were initially metrologically detected. The types of operating values 10 relate to the speed v and acceleration a of multiple motor vehicles.

Subsequently, the detected operating values were assigned to bins 4 according to a predefined binning rule with respect to the speed v and the acceleration a. In the illustration, individual bins 4 are denoted by a reference character.

In addition, multiple transition values 24 were identified for each bin 4. The drawing, by way of example, illustrates transition values T of a bin $H_{31,5}$. Depending on a change in acceleration Δa and a change in speed Δv, the transition values T indicate how often the operating values, based upon bin $H_{31,5}$, change in accordance with the changes in acceleration Δa, and the change in speed Δv.

FIG. 6 is a schematic illustration of the principle of a segmentation process. In an identification step, an initial test cycle 25 was established using a Markov chain process. Initial specification variables 26 of the initial test cycle 25 are an acceleration a und a speed v.

Initial test cycle segments 27 are to be identified on the basis of the initial test cycle 25. Status values 28 of the initial specification variables 26 were predefined for the segmentation. The segmentation is in each case to be effected at an acceleration a=0 m/s² and a speed of either v=0 km/h or v=8 km/h. At these places (a=0 m/s² and v=0 km/h; a=0 m/s² and v=8 km/h), the initial test cycle 25 is respectively sub-divided. Test points 16 of the initial test cycle 25, which are between two subdivision points 29, together form an initial test cycle segment 27.

The invention claimed is:

1. A method for testing a test machine, comprising:
    measuring operating values of at least two types of operating values of a fielded machine during its intended use;
    assigning the operating values, in an aggregation step, to operating value bins;
    identifying, in a determination step, relative frequencies of the operating value bins as a number of measuring values assigned to a respective operating value bin relative to a total number of measuring values;
    selecting, in a specification step, at least a subset of the at least two types of operating values as test point types;
    determining, in a subsequent identification step, a test plan comprising a sequence of test points of the test point types to be followed by the test machine during testing,
        wherein the test points are selected such that a deviation between
            relative frequencies of test bins in the test plan, and the relative frequencies of the corresponding operating value bins having the same limits as the test bins are minimized;
    operating the test machine by following the sequence of test points; and
    measuring at least one test variable while operating the test machine.

2. The method according to claim 1, wherein the operating values are overwritten or deleted directly after the aggregation step.

3. The method according to claim 1, wherein the operating values are measured in a plurality of fielded machines.

4. The method according to claim 1, wherein, in the specification step, all of the at least two types of operating values are selected.

5. The method according to claim 1,
    wherein, in the aggregation step, operating transition values are identified for one or multiple types of binned operating values, wherein an operating transition value is the number of changes of a type of operating values or multiple types of operating values from one bin to another bin, and
    wherein, in the identification step, the sequence of test points is determined on the basis of the relative frequencies of the operating value bins and the transition values,
    wherein the test points are determined in the identification step in such a way that, in addition to a deviation between
        the relative frequencies of the test bins and the relative frequencies of the corresponding operating value bins being minimized also a deviation between
        test transition values, defined as the number of changes of test points between the test bins, and
        the corresponding operating transition values is minimized.

6. The method according to claim 5, wherein, in the identification step, the test points are determined using a Markov chain process on the basis of the relative frequencies the operating value bins and the operating transition values.

7. The method according to claim 5, wherein, in the identification step, test points of an initial test plan are determined using a Markov chain process, on the basis of the relative frequencies of the operating value bins and the operating transition values.

8. The method according to claim 7, wherein, in the identification step, subsequent to the determination of the test points of the initial test plan, the initial test plan is sub-divided into initial test plan segments using a segmentation process.

9. The method according to claim 8, wherein the segmentation process includes
    defining at least one status value for at least one initial test point of the initial test plan,
    wherein the initial test plan segments are generated such that each first and each last initial test point of each initial specification parameter, for which the at least one status value was defined, has the respective status value.

10. The method according to claim 9, wherein the segmentation process includes
    defining at least one status value for each of at least two initial test points of the initial test plan,
    wherein the initial test plan segments are generated such that each first and each last initial test point of each initial test point type, for which the at least one status value was defined, has the respective status value.

11. The method according to claim 8, wherein the initial test plan segments are randomly combined to form the test plan which minimizes the deviation between the relative frequencies of support point bins and the relative frequencies of the corresponding operating value bins.

12. The method according to claim 8,
    wherein a plurality of candidate test plans are generated from the initial test plan segments using at least one random process, and
    wherein the candidate test plans are rated in view of the deviation between the relative frequencies of support point bins and the relative frequencies of the corresponding operating value bins in each candidate test plan, and
    wherein the candidate test plan having the smallest deviation between the relative frequencies of support point bins and the relative frequencies of the corresponding operating value bins is selected as the test plan.

13. The method according to claim 1, wherein the test points are identified by a mathematical model of the test machine.

\* \* \* \* \*